United States Patent
Watanabe et al.

(10) Patent No.: US 6,385,525 B2
(45) Date of Patent: May 7, 2002

(54) APPARATUS FOR DETECTING CONDITION OF ROAD SURFACE

(75) Inventors: Takashi Watanabe, Nagoya; Shoichi Masaki, Chiryu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/819,660

(22) Filed: Mar. 29, 2001

(30) Foreign Application Priority Data

Apr. 6, 2000 (JP) ........................................ 2000-105283

(51) Int. Cl.⁷ .............................................. G06F 15/14
(52) U.S. Cl. ............................. 701/80; 701/70; 701/71; 280/5.514
(58) Field of Search ............................. 701/70, 71, 80; 280/5.514; 340/442, 444, 901, 905; 303/139, 172, 196; 700/304

(56) References Cited

U.S. PATENT DOCUMENTS

| | | | |
|---|---|---|---|
| 4,651,290 A | 3/1987 | Masaki et al. | 701/80 |
| 4,912,967 A * | 4/1990 | Shiraishi et al. | 73/105 |
| 4,989,165 A * | 1/1991 | Watanabe et al. | 303/139 |
| 5,719,565 A | 2/1998 | Tsuno et al. | 340/905 |
| 5,760,682 A | 6/1998 | Liu et al. | 340/444 |

FOREIGN PATENT DOCUMENTS

| | | |
|---|---|---|
| JP | 5-126571 | 5/1993 |
| JP | 6-80044 | 3/1994 |
| JP | 6-318297 | 11/1994 |
| JP | 9-20223 | 1/1997 |
| JP | 10-258618 | 9/1998 |

* cited by examiner

Primary Examiner—William A. Cuchlinski, Jr.
Assistant Examiner—Marthe Y. Marc-Coleman
(74) Attorney, Agent, or Firm—Law Offices of David G. Posz

(57) ABSTRACT

An apparatus for detecting a condition of a road surface includes a vehicle wheel speed detecting device for outputting a vehicle wheel speed signal representing a speed of a wheel of a vehicle. A vehicle wheel speed summating device operates for summating variations in the vehicle wheel speed represented by the vehicle wheel speed signal during every time period corresponding to one revolution of the vehicle wheel, and for generating a summation value representing a result of the summating. A road-surface condition detecting device for detecting a road-surface condition on the basis of a difference between a current summation value and a previous summation value generated by the vehicle wheel speed summating device.

15 Claims, 11 Drawing Sheets

BEFORE-FILTERING VEHICLE-WHEEL
ACCELERATION (DVW)

AFTER-FILTERING VEHICLE-WHEEL
ACCELERATION (DVWF)

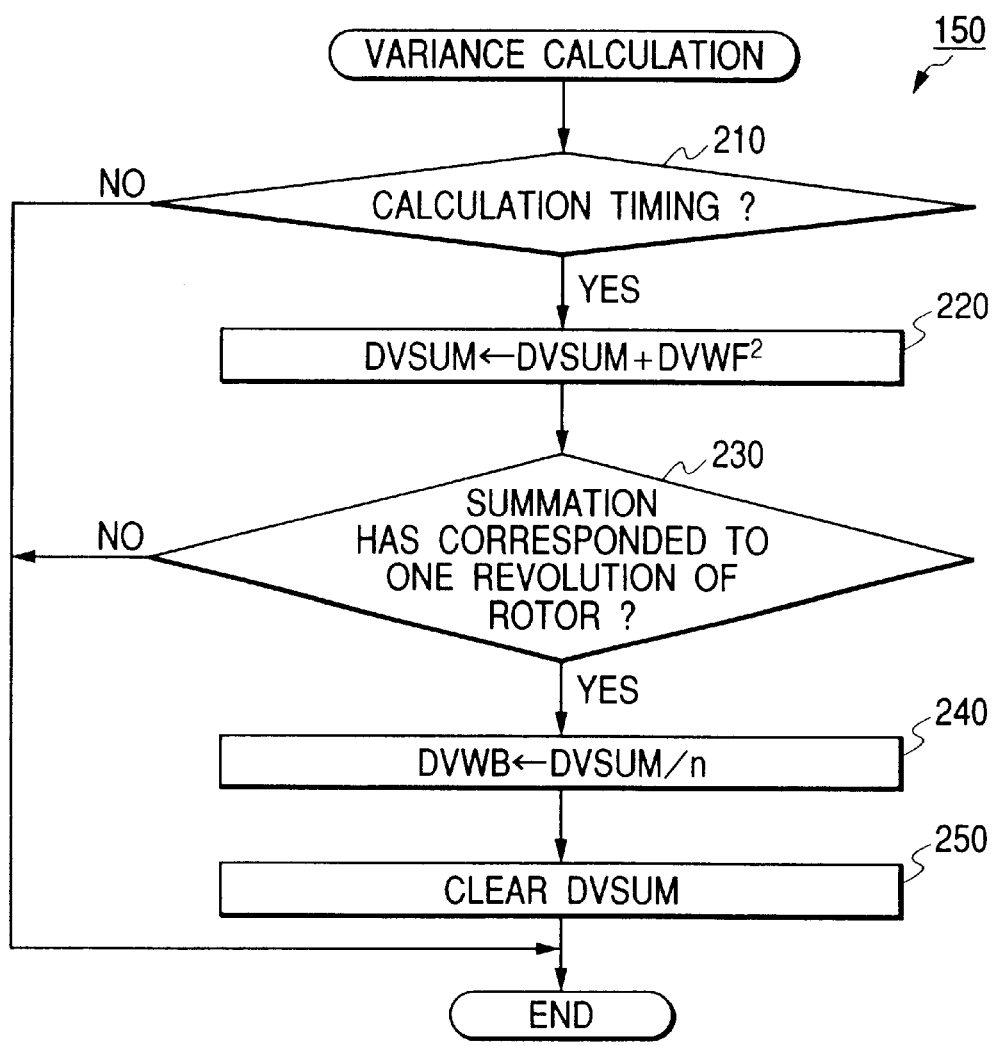

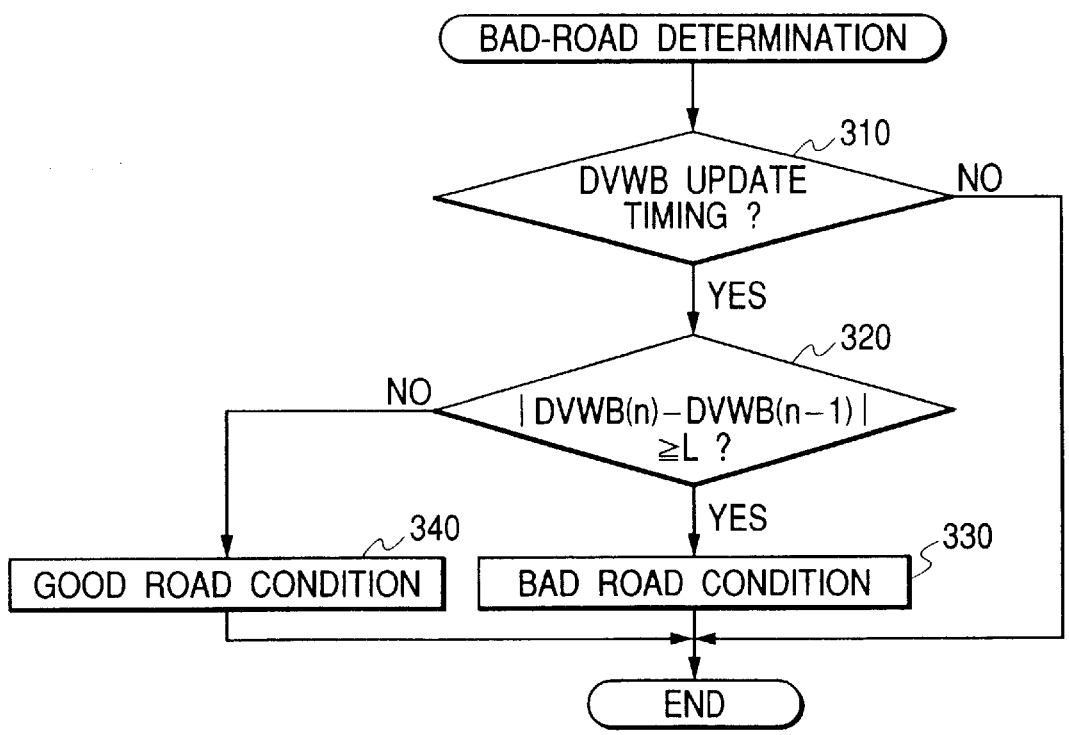

APPARATUS FOR DETECTING CONDITION OF ROAD SURFACE

BACKGROUND OF THE INVENTION

1. Field of the Invention

This invention relates to an apparatus mounted on a vehicle for detecting a condition of a road surface while the vehicle is traveling.

2. Description of the Related Art

U.S. Pat. No. 5,719,565 corresponding to Japanese patent application publication number 9-20223 discloses an apparatus mounted on a vehicle for detecting a condition of a road surface while the vehicle is traveling. In the apparatus of U.S. Pat. No. 5,719,565, the speeds of wheels of the vehicle are calculated based on wheel speed signals from wheel speed sensors. The accelerations of the wheels are calculated based on the calculated wheel speeds. High frequency components of the calculated wheel accelerations are filtered using high-pass filters to obtain the frequency components of the wheel accelerations which are due only to the road-surface condition. A variance among a limited number of temporally-spaced samples of each filtering-resultant wheel acceleration is calculated, and a determination is made as to whether or not the road-surface condition is bad by referring to the calculated variance. Specifically, when the calculated variance is equal to or greater than a reference value, it is determined that the road-surface condition is bad.

A typical wheel speed sensor includes a rotor which rotates together with a related vehicle wheel. The rotor has teeth. The typical sensor also includes a fixed portion for sensing every projection or every groove in the rotor teeth and thereby generating a wheel speed signal during the rotation of the rotor. In the case where the typical sensor is used by the apparatus of U.S. Pat. No. 5,719,565, a variation in shape and position among the projections or the grooves in the rotor teeth affects the calculated variance. Thus, the variation in shape and position among the projections or the grooves in the rotor teeth lowers the accuracy of the determination as to whether or not the road-surface condition is bad.

Japanese patent application publication number 6-80044 discloses an apparatus mounted on a vehicle for detecting a condition of a road surface while the vehicle is traveling. In the apparatus of Japanese application 6-80044, vehicle wheel speed data are derived from the output signal of a vehicle wheel speed sensor. A differential value of the vehicle wheel speed data is calculated for every unit time. Factors of a sequence of samples of data representing the calculated differential values are calculated as feature quantities related to the vehicle wheel speed. Specifically, with respect to the sample sequence, a mean amplitude, a relative amplitude variation, a histogram variance, and the number of data pieces in an amplitude value specified interval are calculated for every unit time. A fuzzy inference is implemented while the calculated feature quantities are used as input parameters. A determination is made as to whether the road-surface condition is good or bad on the basis of the result of the fuzzy inference.

U.S. Pat. No. 5,760,682 corresponding to Japanese patent application publication number 10-258618 discloses a method for detecting a deflated tire on a vehicle. In the method of U.S. Pat. No. 5,760,682, wheel speed values for each of four wheels are collected and analyzed for a statistical variation which would indicate low tire pressure. Prior to analysis, and following reset of the system, calibration factors are determined for each of the wheels to compensate rolling radius variations, and subsequently used to correct all wheel speed values. The corrected speed values are then filtered to exclude values which represent wheel slippage, rough road fluctuations, vehicle cornering, and uphill or downhill travel. When a sufficient number of values have been collected, an F-value is calculated substantially according to the statistical method "analysis of the variance", and the F-value is compared to an empirically determined value corresponding to a predetermined pressure loss. This comparison can provide the basis for a driver warning. Since a larger F-value indicates a larger statistical difference in wheel speeds, the value can be rechecked after a further interval for additional pressure loss.

U.S. Pat. No. 4,651,290 corresponding to Japanese patent application publication number 6-318297 discloses an apparatus mounted on a vehicle for detecting a condition of a road surface while the vehicle is traveling. In the apparatus of U.S. Pat. No. 4,651,290, the speed of a wheel of the vehicle is calculated based on the output signal of a wheel speed sensor. The acceleration of the wheel is calculated based on the calculated wheel speed. The performance criterion of the road-surface condition is computed based on the calculated wheel acceleration. The computed performance criterion is compared with a setting value to determine wether the road-surface condition is good or bad. A first example of the performance criterion depends on a variance among a predetermined number of temporally-spaced samples of the wheel acceleration. A second example of the performance criterion depends on the number of samples of the wheel acceleration which exceed a reference value for every predetermined time interval. A third example of the performance criterion depends on the difference between the maximum and the minimum among the values indicated by temporally-spaced samples of the wheel acceleration for every predetermined time interval.

Japanese patent application publication number 5-126571 discloses an apparatus mounted on a vehicle for measuring the shape of a road surface. The apparatus of Japanese application 5-126571 includes a distance detector for detecting the distance between the road surface and a main body of the vehicle. The apparatus also includes an acceleration detector for detecting the vertical acceleration of the main body of the vehicle. The detected vertical acceleration is integrated on a second-order basis to calculate the amount of vertical vibration of the main body of the vehicle for every time interval corresponding to a predetermined distance traveled by the vehicle. The detected distance between the road surface and the main body of the vehicle is corrected in response to the calculated amount of vertical vibration. The shape of the road surface is detected on the basis of the correction resultant distance.

SUMMARY OF THE INVENTION

It is an object of this invention to provide an apparatus for accurately detecting a condition of a road surface even in the case where there is a variation in shape and position among the projections or the grooves in teeth of a rotor of a wheel speed sensor.

A first aspect of this invention provides an apparatus for detecting a condition of a road surface. The apparatus comprises vehicle wheel speed detecting means for outputting a vehicle wheel speed signal representing a speed of a wheel of a vehicle; vehicle wheel speed summating means for summating variations in the vehicle wheel speed represented by the vehicle wheel speed signal during every time period corresponding to one revolution of the vehicle wheel, and for generating a summation value representing a result of said summating; and road-surface condition detecting means for detecting a road-surface condition on the basis of a difference between a current summation value and a previous summation value generated by the vehicle wheel speed summating means.

A second aspect of this invention is based on the first aspect thereof, and provides an apparatus further comprising vehicle wheel acceleration calculating means for calculating an acceleration of the vehicle wheel from the vehicle wheel speed signal outputted from the vehicle wheel speed detecting means; and means provided in the vehicle wheel speed summating means for summating variations in the vehicle wheel acceleration calculated by the vehicle wheel acceleration calculating means, and for using a result of summating the variations in the vehicle wheel acceleration as a result of summating the variations in the vehicle wheel speed.

A third aspect of this invention is based on the first aspect thereof, and provides an apparatus further comprising vehicle wheel acceleration calculating means for calculating an acceleration of the vehicle wheel from the vehicle wheel speed signal outputted from the vehicle wheel speed detecting means; variance calculating means for calculating a variance of the vehicle wheel acceleration calculated by the vehicle wheel acceleration calculating means; and means provided in the vehicle wheel speed summating means for using the variance calculated by the variance calculating means as a result of summating the variations in the vehicle wheel speed.

A fourth aspect of this invention is based on the first aspect thereof, and provides an apparatus further comprising acceleration differential value calculating means for calculating a differential value of an acceleration of the vehicle wheel from the vehicle wheel speed signal outputted from the vehicle wheel speed detecting means; and means provided in the vehicle wheel speed summating means for summating variations in the differential value calculated by the acceleration differential value calculating means, and for using a result of summating the variations in the differential value as a result of summating the variations in the vehicle wheel speed.

A fifth aspect of this invention provides an apparatus for detecting a condition of a road surface. The apparatus comprises vehicle wheel speed detecting means for outputting a vehicle wheel speed signal representing a speed of a wheel of a vehicle; learning means for learning a variation in the vehicle wheel speed represented by the vehicle wheel speed signal outputted from the vehicle wheel speed detecting means, and for generating a learning-resultant value representing a result of said learning; and road-surface condition detecting means for detecting a road-surface condition on the basis of a difference between the learning-resultant value and a variation in the vehicle wheel speed represented by the vehicle wheel speed signal outputted from the vehicle wheel speed detecting means.

A sixth aspect of this invention is based on the fifth aspect thereof, and provides an apparatus wherein the learning means comprises means for extracting components from the variation in the vehicle wheel speed which are caused by a variation in rotor manufacture accuracy, and means for learning the extracted components of the variation in the vehicle wheel speed which are caused by a variation in rotor manufacture accuracy.

A seventh aspect of this invention is based on the fifth aspect thereof, and provides an apparatus wherein the learning means comprises means for learning an average of a value of summation of variations in the vehicle wheel speed.

An eighth aspect of this invention is based on the fifth aspect thereof, and provides an apparatus further comprising vehicle wheel acceleration calculating means for calculating an acceleration of the vehicle wheel from the vehicle wheel speed signal outputted from the vehicle wheel speed detecting means; means provided in the learning means for learning a variation in the vehicle wheel acceleration calculated by the vehicle wheel acceleration calculating means, and for using a result of learning the variation in the vehicle wheel acceleration as the learning-resultant value representing the result of learning the variation in the vehicle wheel speed; and means provided in the road-surface condition detecting means for detecting the road-surface condition on the basis of a difference between the learning-resultant value and a variation in the vehicle wheel acceleration calculated by the vehicle wheel acceleration calculating means.

A ninth aspect of this invention is based on the fifth aspect thereof, and provides an apparatus further comprising vehicle wheel acceleration calculating means for calculating an acceleration of the vehicle wheel from the vehicle wheel speed signal outputted from the vehicle wheel speed detecting means; variance calculating means for calculating a variance of the vehicle wheel acceleration calculated by the vehicle wheel acceleration calculating means; means provided in the learning means for learning a variation in the variance calculated by the variance calculating means, and for using a result of learning the variation in the variance as the learning-resultant value representing the result of learning the variation in the vehicle wheel speed; and means provided in the road-surface condition detecting means for detecting the road-surface condition on the basis of a difference between the learning-resultant value and a variation in the variance calculated by the variance calculating means.

A tenth aspect of this invention is based on the fifth aspect thereof, and provides an apparatus further comprising acceleration differential value calculating means for calculating a differential value of an acceleration of the vehicle wheel from the vehicle wheel speed signal outputted from the vehicle wheel speed detecting means; means provided in the learning means for learning a variation in the differential value calculated by the acceleration differential value calculating means, and for using a result of learning the variation in the differential value as the learning-resultant value representing the result of learning the variation in the vehicle wheel speed; and means provided in the road-surface condition detecting means for detecting the road-surface condition on the basis of a difference between the learning-resultant value and a variation in the differential value calculated by the acceleration differential value calculating means.

An eleventh aspect of this invention is based on the first aspect thereof, and provides an apparatus wherein the vehicle wheel speed detecting means comprises a vehicle wheel speed sensor.

A twelfth aspect of this invention provides an on-vehicle apparatus for detecting a condition of a road surface. The on-vehicle apparatus comprises first means for detecting a rotational speed of a vehicle wheel; second means for calculating an acceleration of the vehicle wheel from the vehicle-wheel speed detected by the first means; third means for periodically sampling the vehicle-wheel acceleration calculated by the second means to generate samples of the vehicle-wheel acceleration; fourth means for calculating a first variance among samples of the vehicle-wheel acceleration which are generated by the third means for a first time interval corresponding to current one revolution of the vehicle wheel, and calculating a second variance among samples of the vehicle-wheel acceleration which are generated by the third means for a second time interval corresponding to previous one revolution of the vehicle wheel; fifth means for calculating a difference between the first and second variances calculated by the fourth means; and sixth means for detecting a road-surface condition in response to the difference calculated by the fifth means.

A thirteenth aspect of this invention is based on the twelfth aspect thereof, and provides an on-vehicle apparatus wherein the sixth means comprises 1) seventh means for determining whether or not the difference calculated by the fifth means is smaller than a predetermined reference value, 2) eighth means for determining that the road-surface condition is good when the seventh means determines that the difference is smaller than the predetermined reference value, and 3) ninth means for determining that the road-surface condition is bad when the seventh means determines that the difference is not smaller than the predetermined reference value.

A fourteenth aspect of this invention provides an on-vehicle apparatus for detecting a condition of a road surface. The on-vehicle apparatus comprises first means for detecting a rotational speed of a vehicle wheel; second means for calculating an acceleration of the vehicle wheel from the vehicle-wheel speed detected by the first means; third means for periodically sampling the vehicle-wheel acceleration calculated by the second means to generate samples of the vehicle-wheel acceleration; fourth means for calculating a variance among samples of the vehicle-wheel acceleration which are generated by the third means for every time interval; fifth means for periodically calculating a first difference between two successive variances calculated by the fourth means; sixth means for periodically determining whether or not the first difference calculated by the fifth means is smaller than a predetermined reference value; seventh means for, only when the sixth means determines that the first difference is smaller than the predetermined reference value, defining a variance calculated by the fourth means and relating to the first difference as an effective reference; eighth means for generating a learning-resultant value in response to effective references generated by the seventh means; ninth means for calculating a second difference between a current variance calculated by the fourth means and the learning-resultant value generated by the eighth means; and tenth means for detecting a road-surface condition in response to the second difference calculated by the ninth means.

A fifteenth aspect of this invention is based on the fourteenth aspect thereof, and provides an on-vehicle apparatus wherein the tenth means comprises 1) eleventh means for determining whether or not the second difference calculated by the ninth means is smaller than a predetermined criterional value, 2) twelfth means for determining that the road-surface condition is good when the eleventh means determines that the second difference is smaller than the predetermined criterional value, and 3) thirteenth means for determining that the road-surface condition is bad when the eleventh means determines that the second difference is not smaller than the predetermined criterional value.

BRIEF DESCRIPTION OF THE DRAWINGS

FIG. 6 is a flowchart of a variance calculation block in FIG. 3.

FIG. 8 is a flowchart of a bad-road determination block in FIG. 3.

DETAILED DESCRIPTION OF THE INVENTION

First Embodiment

Figure 1:
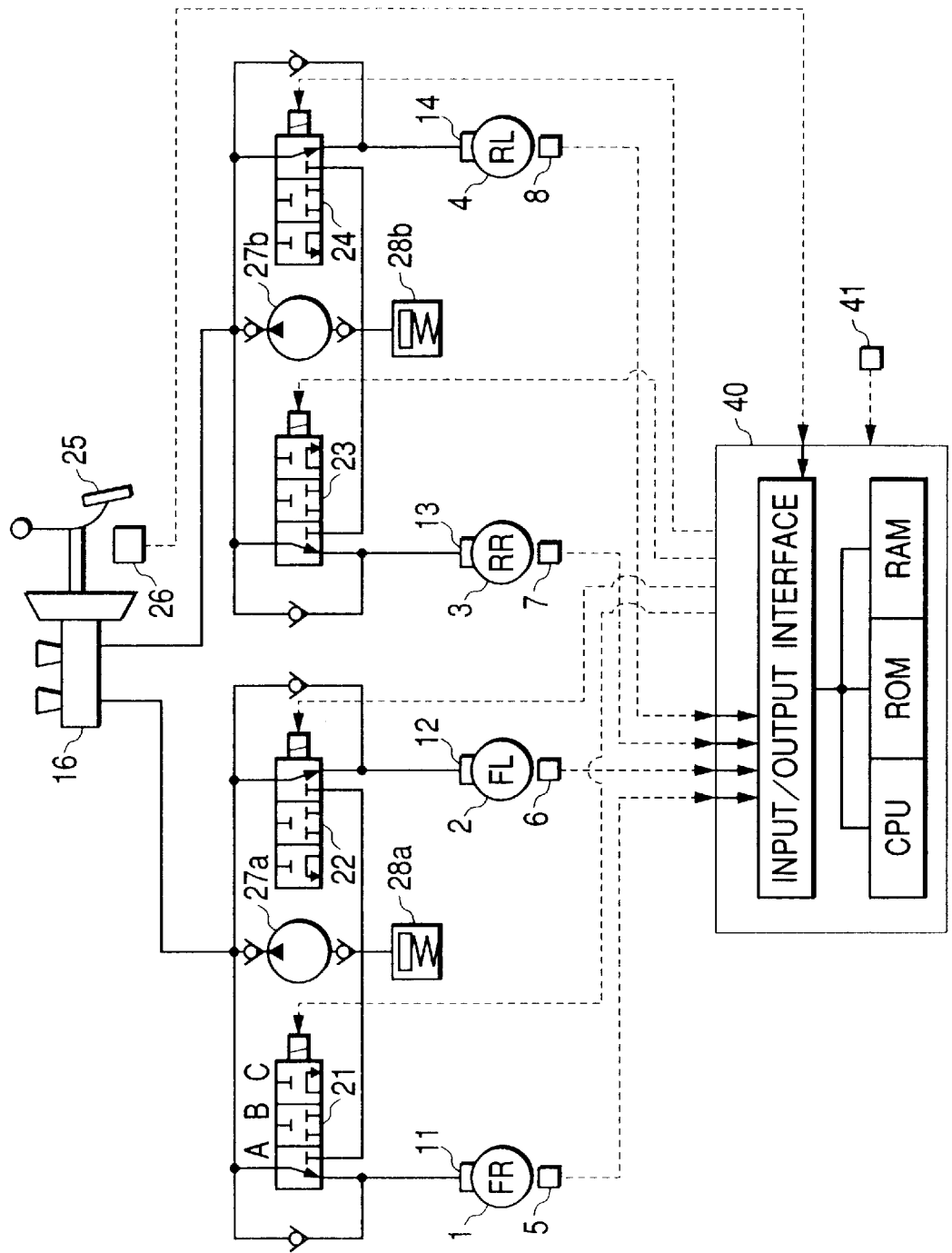
FIG. 1 is a diagram of an anti-skid control system for a vehicle which includes a road-surface condition detecting apparatus according to a first embodiment of this invention.

FIG. 1 shows an anti-skid control system for a vehicle which includes a road-surface condition detecting apparatus according to a first embodiment of this invention. The vehicle is of a front-engine rear-drive type.

With reference to FIG. 1, the vehicle has a front-right (FR) wheel 1, a front-left (FL) wheel 2, a rear-right (RR) wheel 3, and a rear-left (RL) wheel 4. Vehicle wheel speed sensors 5, 6, 7, and 8 are associated with the vehicle wheels 1, 2, 3, and 4, respectively. The vehicle wheel speed sensors 5–8 are of a known type, for example, an electromagnetic type or a magnetoresistive type. The vehicle wheel speed sensors 5, 6, 7, and 8 include rotors which rotate together with the vehicle wheels 1, 2, 3, and 4, respectively. Each of the rotors has teeth. The vehicle wheel speed sensors 5, 6, 5 7, and 8 output pulse signals having frequencies depending on the rotational speeds of the vehicle wheels 1, 2, 3, and 4, respectively.

Hydraulic brake units (wheel cylinders) 11, 12, 13, and 14 are associated with the vehicle wheels 1, 2, 3, and 4, respectively. The wheel cylinders 11, 12, 13, and 14 act to apply braking forces to the vehicle wheels 1, 2, 3, and 4, respectively. A master cylinder 16 is connected with the wheel cylinders 11, 12, 13, and 14 via electrically-driven valve units 21, 22, 23, and 24 and hydraulic lines (no reference numerals). A hydraulic pressure (a fluid pressure) generated by the master cylinder 16 can be transmitted to the wheel cylinders 11, 12, 13, and 14 via the valve units 21, 22, 23, and 24. The hydraulic pressures exerted on the wheel cylinders 11, 12, 13, and 14 can be adjusted by the valve units 21, 22, 23, and 24, respectively.

A brake pedal 25 is connected with the master cylinder 16. A stop switch 26 is associated with the brake pedal 25. Depression of the brake pedal 25 is detected by the stop switch 26. Specifically, the stop switch 26 changes between an ON position and an OFF position in response to whether or not the brake pedal 25 is depressed. The stop switch 26 outputs an ON signal when the brake pedal 25 is depressed to brake the vehicle. Otherwise, the stop switch 213 outputs an OFF signal.

A reservoir 28*a* is provided as a temporary storage for brake fluid (hydraulic fluid) discharged from the wheel cylinders 11 and 12 when the related wheel-cylinder hydraulic pressures are reduced during the execution of anti-skid control. Similarly, a reservoir 28*b*) is provided as a temporary storage for brake fluid (hydraulic fluid) discharged from the wheel cylinders 13 and 14 when the related wheel-cylinder hydraulic pressures are reduced during the execution of anti-skid control. Hydraulic pumps 27*a* and 27*b* are driven by a motor (not shown). The hydraulic pump 27*a* acts to return brake fluid from the reservoir 28*a* toward the master cylinder 16. Similarly, the hydraulic pump 27*b* acts to return brake fluid from the reservoir 28*b* toward the master cylinder 16.

The valve units 21–24 are electrically connected to an electronic control unit (ECU) 40. The valve units 21–24 can be controlled by the electronic control unit 40. During the execution of anti-skid control, the valve units 21–24 adjust the hydraulic pressures in the wheel cylinders 11–14, thereby controlling the braking forces on the vehicle wheels 1–4 respectively. The valve units 21–24 are similar in operation. Therefore, only operation of the valve unit 21 will be explained below in more detail. The valve unit 21 can control the connection among the wheel cylinder 11, the master cylinder 16, and the reservoir 28*a*. The valve unit 21 can change among three different positions, that is, a pressure increasing mode position "A", a pressure maintaining mode position "B", and a pressure decreasing mode position "C". When the valve unit 21 assumes the pressure increasing mode position "A", the wheel cylinder 11 is connected to the master cylinder 16 and is disconnected from the reservoir 28*a* so that pressurized fluid is driven from the master cylinder 16 toward the wheel cylinder 11. Thus, in this case, the hydraulic pressure in the wheel cylinder 11 increases. When the valve unit 21 assumes the pressure maintaining mode position "B", the wheel cylinder 11 is disconnected from both the master cylinder 16 and the reservoir 28*a* so that the hydraulic pressure in the wheel cylinder 11 is substantially maintained as it is. When the valve unit 21 assumes the pressure decreasing mode position "C", the wheel cylinder 11 is connected to the reservoir 28*a* and is disconnected from the master cylinder 16 so that brake fluid escapes from the wheel cylinder 11 toward the reservoir 28*a*.

Thus, in this case, the hydraulic pressure in the wheel cylinder 11 decreases. The valve unit 21 assumes the pressure increasing mode position "A" when being deactivated. The valve unit 21 assumes either the pressure maintaining mode position "B" or the pressure decreasing mode position "C" when being activated. In this case, the position of the valve unit 21 depends on the level of the activation current fed thereto.

The electronic control unit 40 includes a microcomputer having a combination of a CPU, a ROM, a RAM, and an I/O interface. The I/O interface is electrically connected to the vehicle wheel speed sensors 5–8. The I/O interface receives the output signals from the vehicle wheel speed sensors 5–8. The I/O interface is electrically connected to the stop switch 26. The I/O interface receives the output signal from the stop switch 26. The I/O interface is electrically connected to the valve units 21–24. The I/O interface outputs drive control signals to the valve units 21–24. The electronic control unit 40 operates in accordance with a program stored in the ROM. The electronic control unit 40 is electrically connected to an ignition switch 41. When the ignition switch 41 is changed to its ON position, the electronic control unit 40 starts to be fed with electric power from a power supply (not shown). Thus, the electronic control unit 40 starts programmed signal processing for braking—force control (anti-skid control). The electronic control unit 40 generates the drive control signals for the valve units 21–24 in response to the output signals from the vehicle wheel speed sensors 5–8 and the stop switch 26 according to a program for the braking-force control. The electronic control unit 40 feeds the generated drive signals to the valve units 21–24, thereby implementing the braking-force control (the anti-skid control).

Figure 2:
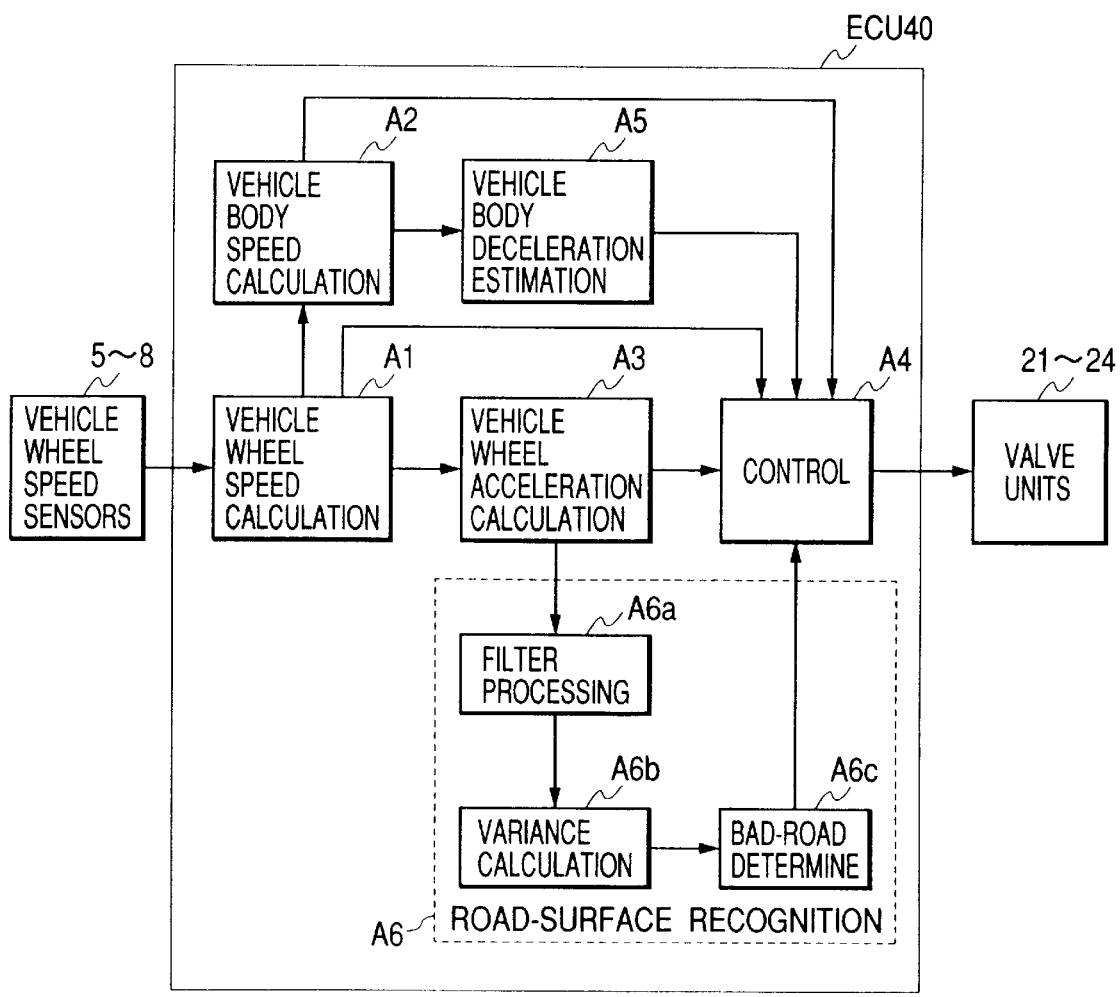
FIG. 2 is an operation flow diagram of an electronic control unit in FIG. 1.

FIG. 2 shows the flow of anti-skid control operation of the electronic control unit 40 rather than the hardware structure thereof. With reference to FIG. 2, a vehicle wheel speed calculation block A1 receives the output signals from the vehicle wheel speed sensors 5–8. The vehicle wheel speed calculation block A1 computes the rotational speeds of the vehicle wheels 1–4 in response to the output signals from the vehicle wheel speed sensors 5–8 respectively. The vehicle wheel speed calculation block A1 informs a vehicle body speed calculation block A2, a vehicle wheel acceleration calculation block A3, and a control block A4 of the computed vehicle wheel speeds. The vehicle body speed calculation block A2 computes the speed of the body of the vehicle from the vehicle wheel speeds. The vehicle body speed calculation block A2 informs the control block A4 and a vehicle body deceleration estimation block A5 of the computed vehicle body speed. The vehicle body deceleration estimation block A5 estimates the deceleration of the body of the vehicle in response to the vehicle body speed. The vehicle body deceleration estimation block A5 informs the control block A4 of the estimated vehicle body deceleration.

The vehicle wheel acceleration calculation block A3 computes the accelerations of the vehicle wheels 1–4 from the vehicle wheel speeds. The vehicle wheel acceleration calculation block A3 informs the control block A4 of the computed vehicle wheel accelerations. A road-surface recognition block A6 includes a filter block A6*a*, a variance calculation block A6*b*, and a bad-road determination block A6*c*. The vehicle wheel acceleration calculation block A3 informs the filter block A6*a* of the computed vehicle wheel accelerations. The filter block A6*a* subjects the vehicle wheel accelerations to filtering processes, thereby generating filtering-resultant vehicle wheel accelerations. The filter block A6*a* informs the variance calculation block A6*b* of the filtering-resultant vehicle wheel accelerations. The variance calculation block A6*b* computes variances with respect to the filtering-resultant vehicle wheel accelerations. The variance calculation block A6*b* informs the bad-road determination block A6*c* of the computed variances. The bad-road determination block A6*c* determines whether or not the road surface along which the vehicle is traveling is bad (rough) on the basis of the variances. The bad-road determination block A6*c* informs the control block A4 of the bad-road determination result.

The control block A4 generates drive control signals for the valve units 21–24 on the basis of the vehicle wheel speeds, the estimated vehicle body deceleration, the vehicle body speed, the vehicle wheel accelerations, and the bad-road determination result. The generated drive control signals are designed to implement the anti-skid control. The drive control signals are transmitted from the control block A4 to the valve units 21–24. Therefore, the braking forces applied to the vehicle wheels 1–4 are adjusted, and the anti-skid control is implemented.

Figure 3:
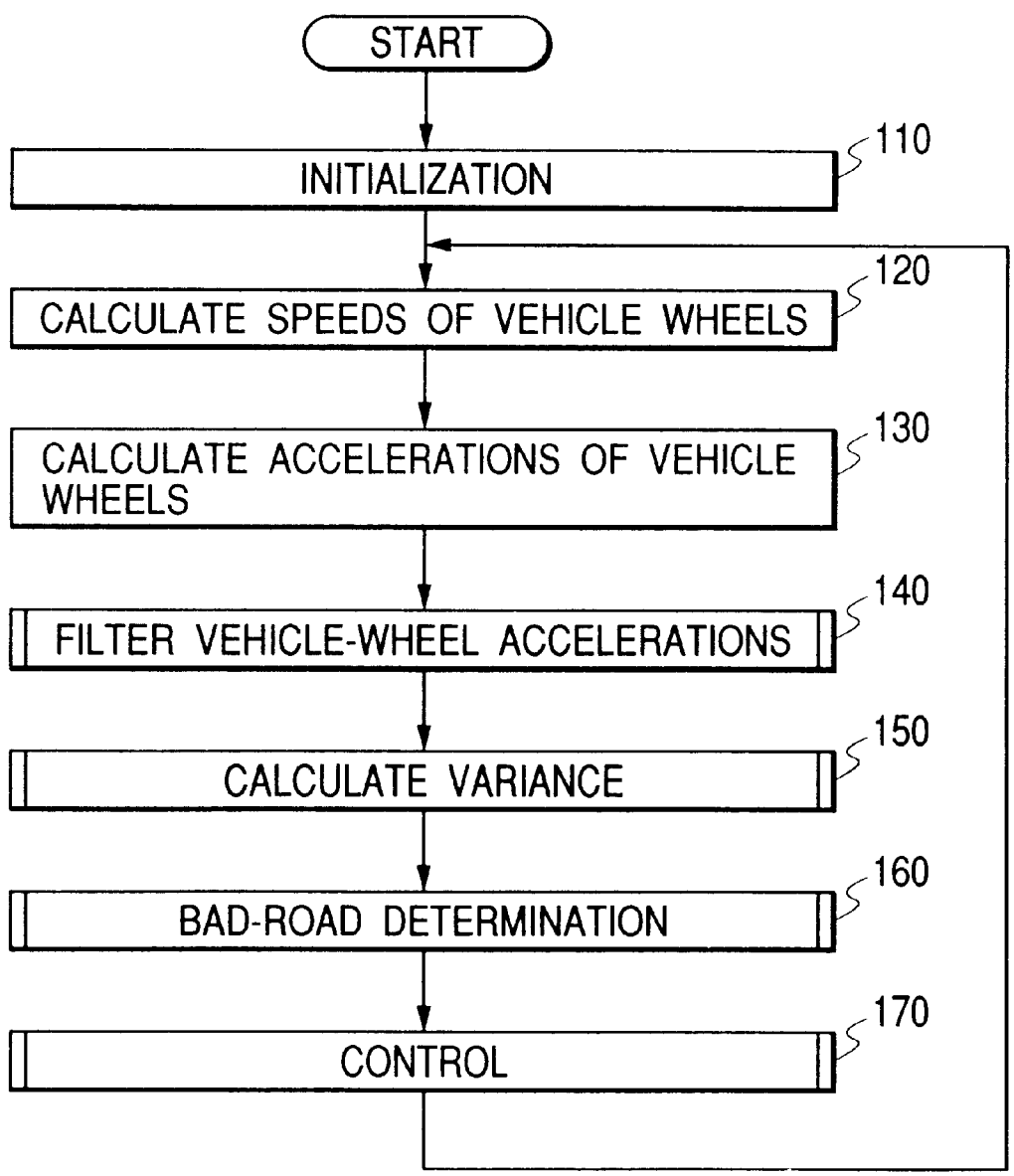
FIG. 3 is a flowchart of a segment of a program for the electronic control unit in FIG. 1.

As previously mentioned, the electronic control unit 40 operates in accordance with a program stored in its internal ROM. FIG. 3 is a flowchart of a segment of the program which relates to the anti-skid control. The program segment is started when the ignition switch 41 (see FIG. 1) is changed to its ON position.

As shown in FIG. 3, a first step 110 of the program segment initializes variables including flags and counter values. After the step 110, the program advances to a step 120. As will be made clear later, a sequence of the step 120 and subsequent step and blocks is periodically iterated.

The step 120 computes the rotational speeds of the vehicle wheels 1–4 (see FIG. 1) on the basis of the output signals from the vehicle wheel speed sensors 5–8 (see FIG. 1) respectively.

A step 130 following the step 120 computes the accelerations of the vehicle wheels 1–4 from the vehicle wheel speeds given by the step 120.

A block 140 subsequent to the step 130 subjects the vehicle wheel accelerations (the before-filtering vehicle wheel accelerations) given by the step 130 to high-pass filtering processes to extract high-frequency components. Thus, the block 140 provides the filtering-resultant vehicle wheel accelerations (the after-filtering vehicle wheel accelerations).

A block 150 following the block 140 computes variances of the filtering-resultant vehicle wheel accelerations given by the block 140.

A block 160 subsequent to the block 150 determines whether or not the road surface along which the vehicle is traveling is bad (rough) on the basis of the variances given by the block 150.

A block 170 following the block 160 sets reference slip ratios for the vehicle wheels 1–4 in response to the result of the bad-road determination by the block 160. The block 170 calculates the current slip ratios of the vehicle wheels 1–4 in a known way. For each of the vehicle wheels 1–4, the block 170 compares the current slip ratio with the corresponding reference slip ratio. When the current slip ratio exceeds the reference slip ratio, the block 170 implements processing for ABS (antilock brake system) control in a known way. Thus, the block 170 executes processing for the anti-skid control. After the block 170, the program returns to the step 120.

The filtering block 140 will be described below in more detail.

For each of the vehicle wheels 1–4, the block 140 implements the filtering process and calculates the current filtering-resultant vehicle wheel acceleration DVWFD(n) according to the following equation.

$$DVWFD(n)=A0 \cdot DVW(n)+A1 \cdot DVW(n-1)+A2 \cdot DVW(n-2)+ B0 \cdot DVWF(n-1)+B1 \cdot DVWF(n-2) \quad (1)$$

where DVW(n), DVW(n−1), and DVW(n−2) denote the current value, the immediately previous value, and the second immediately previous value of the before-filtering vehicle wheel acceleration (the vehicle wheel acceleration given by the step 130) respectively; DVWF(n−1) and DVWF(n−2) denote the immediately previous value and the second immediately value of the after-filtering vehicle wheel acceleration respectively; and A0, A1, A2, B0, and B1 denote filter coefficients. Here, "current value" means the value provided in the current execution cycle of the sequence of the steps and blocks 120–170. In addition, "immediately previous value" means the value provided in the execution cycle of the sequence of the steps and blocks 120–170 which immediately precedes the current execution cycle. Furthermore, "second immediately previous value" means the value provided in the execution cycle of the sequence of the steps and blocks 120–170 which second-immediately precedes the current execution cycle. The filter coefficients A0, A1, A2, B0, and B1 are preset so that the filtering process by the block 140 will be of a high-pass type for extracting only components in a prescribed high-frequency band. Specifically, the filtering process is tuned to separate frequency components related to bad road surfaces such as off-road surfaces from frequency components related to vehicle body deceleration and anti-skid control. For example, the filter coefficients A0, A1, A2, B0, and B1 are prechosen to extract components in a frequency band extending above a specific value in the range of 20 to 30 Hz. The block 140 sets the calculated current filtering-resultant vehicle wheel acceleration DVWFD(n) as the current after-filtering vehicle wheel acceleration DVWF.

Figure 4:
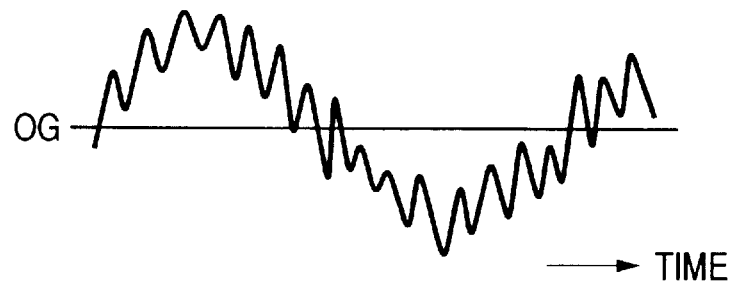
FIG. 4 is a time-domain diagram of an example of a before-filtering vehicle wheel acceleration DVW.
Figure 5:
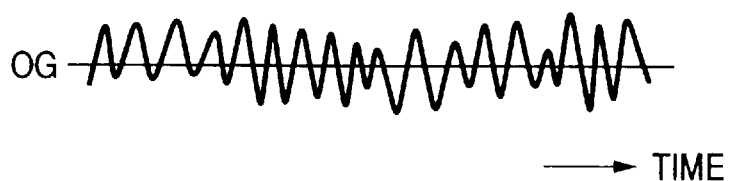
FIG. 5 is a time-domain diagram of an example of an after-filtering vehicle wheel acceleration DVWF.

As shown in FIG. 4, the before-filtering vehicle wheel acceleration DVW pulsates at a low frequency due to vehicle body deceleration and anti-skid control. The filtering process by the block 140 removes the low-frequency pulsation from the before-filtering vehicle wheel acceleration DVW, and thereby converts the before-filtering vehicle wheel acceleration DVW into the after-filtering vehicle wheel acceleration DVWF which has a waveform as shown in FIG. 5. The after-filtering vehicle wheel acceleration DVWF has only high-frequency components related to road-surface conditions, that is, related to bad road surfaces such as off-road surfaces.

The variance calculation block 150 in FIG. 3 will be described below in more detail. For each of the vehicle wheels 1–4, the block 150 calculates a variance DVWB among a limited number "n" of samples of the after-filtering vehicle wheel acceleration DVWF according to the following equation.

$$DVWB=\{DVWF(1)^2+ \ldots +DVWF(n-1)^2+DVWF(n)^2\}/2 \quad (2)$$

where DVWF(1), . . . , DVWF(n−1), and DVWF(n) denote the oldest, . . . , the immediately previous sample, and the current sample among the limited number of samples of the after-filtering vehicle wheel acceleration DVWF, respectively.

As shown in FIG. 6, the block 150 has steps 210, 220, 230, 240, and 250. The step 210 follows the block 140 (see FIG. 3). The step 210 determines whether or not a predetermined time period (for example, 5 ms) has elapsed since the last execution of the step 220. In the case where the predetermined time period has elapsed, the program advances from the step 210 to the step 220. Otherwise, the program advances from the step 210 to the block 160 (see FIG. 3).

The step 220 uses the current value of the after-filtering vehicle wheel acceleration DVWF given by the block 140 (see FIG. 3) as a current sample thereof. The step 220 calculates the square of the current sample (the current value) of the after-filtering vehicle wheel acceleration DVWF. The step 220 adds the calculated square to a partial-variance summation value DVSUM.

The step 230 follows the step 220. The step 230 determines whether or not the partial-variance summation value DVSUM has corresponded to one revolution (360°-rotation) of the rotor of the related vehicle wheel speed sensor. In the case where the partial-variance summation value DVSUM has corresponded to one revolution of the rotor, the program advances from the step 230 to the step 240. Otherwise, the program advances from the step 230 to the block 160 (see FIG. 3).

The step 240 calculates the variance DVWB which is equal to the partial-variance summation value DVSUM divided by the sample number "n". The step 240 updates the variance. The step 240 stores information of the old variance into the RAM for later use.

The step 250 follows the step 240. The step 250 clears the partial-variance summation value DVSUM to "0". After the step 250, the program advances to the block 160 (see FIG. 3).

Figure 7:
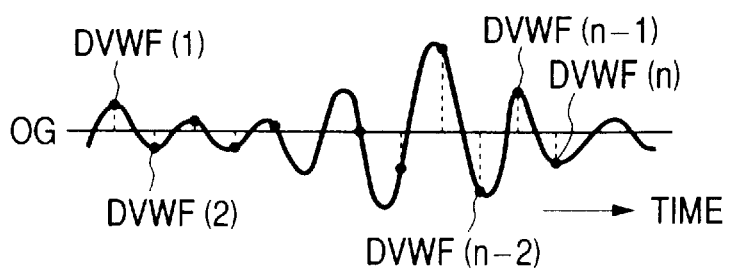
FIG. 7 is a time-domain diagram of an example of an after-filtering vehicle wheel acceleration, and samples thereof.

With reference to FIG. 7, the value of each of samples DVWF(1), DVWF(2), . . . , DVWF(n-1), and DVWF(n) of the after-filtering vehicle wheel acceleration relative to a zero-acceleration "0 G" is squared to calculate a partial variance. The partial variances are summated (summed up). The summation result is divided by the sample number "n" so that the variance DVWB is provided.

The bad-road determination block 160 in FIG. 3 will be described below in more detail. The block 160 has sections for the vehicle wheels 1–4 respectively. The sections are similar. Therefore, only one of the sections will be explained. As shown in FIG. 8, the block 160 has steps 310, 320, 330, and 340. The step 310 is subsequent to the block 150 (see FIG. 3). The step 310 determines whether or not the present moment immediately follows the moment of the execution of the step 240 (see FIG. 6), that is, the moment of the updating of the variance DVWB. In the case where the present moment immediately follows the moment of the updating of the variance DVWB, the program advances from the step 310 to the step 320. Otherwise, the program advances from the step 310 to the block 170 (see FIG. 3).

The step 320 gets the current variance DVWB(n) given by the block 150 (see FIG. 3), and also retrieves the immediately-preceding variance DVWB(n-1) given by the block 150. The step 320 calculates the difference between the variances DVWB(n) and DVWB(n-1). The step 320 computes the absolute value of the calculated difference. The step 320 compares the computed absolute value with a predetermined reference value L corresponding to a pre-scribed bad-road criterional level. When the absolute value is equal to or greater than the reference value L, the program advances from the step 320 to the step 330. Otherwise, the program advances from the step 320 to the step 340.

The step 330 determines that the road surface along which the vehicle is traveling is bad (rough). Specifically, the step 330 sets a flag AK to a state of "1" which represents that the road surface is bad. After the step 330, the program advances to the block 170 (see FIG. 3).

The step 340 determines that the road surface along which the vehicle is traveling is good. Specifically, the step 340 sets the flag AK to a state of "0" which represents that the road surface is good. After the step 340, the program advances to the block 170 (see FIG. 3).

Figure 9:
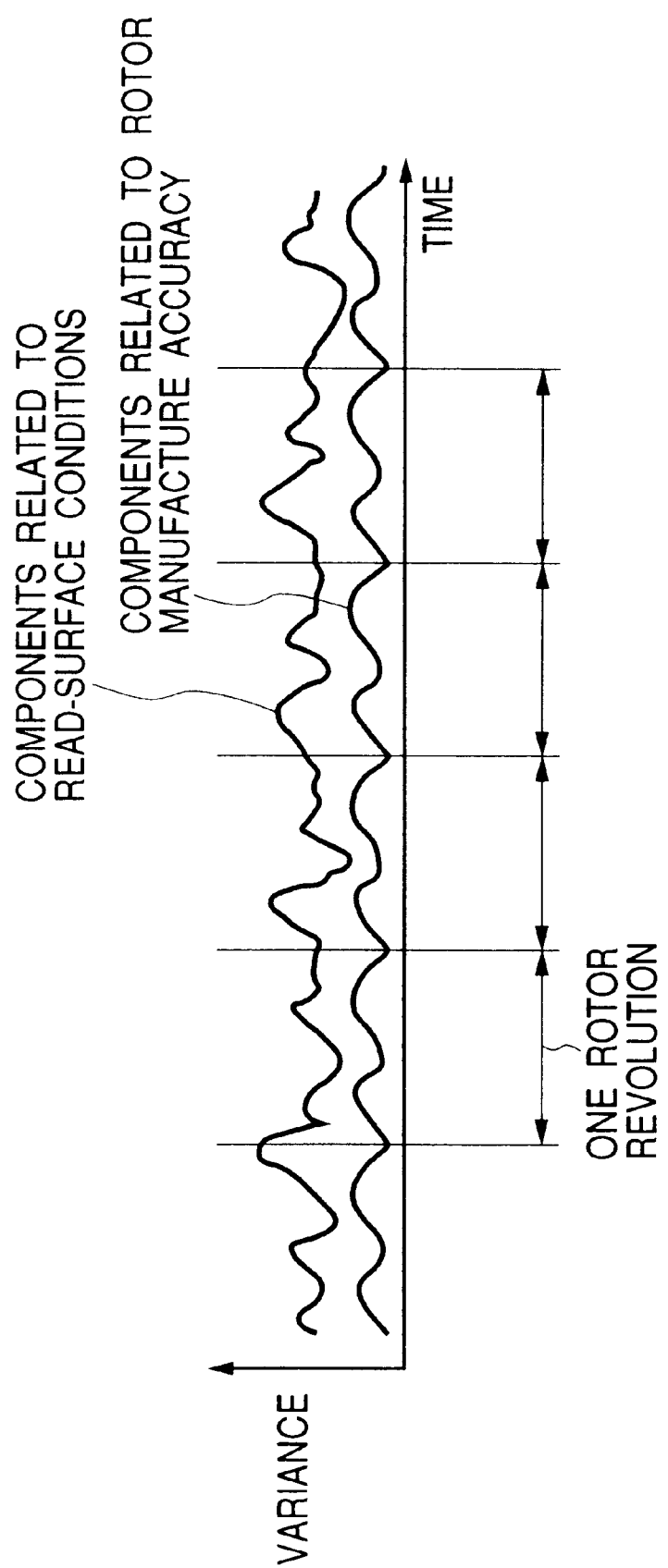
FIG. 9 is a time-domain diagram of an example of variance components caused by a rotor-teeth variation, and an example of variance components related to the roughness of a road surface.

As previously mentioned, the vehicle wheel speed sensors 5–8 include rotors each having teeth. A variation in shape and position among the projections or the grooves in the rotor teeth causes the variance DVWB of the related vehicle wheel acceleration to cyclically change at a period equal to the period of rotation of the rotor. The variance DVWB is equal to the sum of components caused by the rotor-teeth variation and components related to road-surface conditions (roughness of the road surface). An example of a time-domain change in the variance components caused by the rotor-teeth variation, and also an example of a time-domain change in the variance components related to the roughness of the road surface are shown in FIG. 9. The time-domain change in the variance components caused by the rotor-teeth variation has a period equal to the period of rotation of the rotor as shown in FIG. 9. On the other hand, the time-domain change in the variance components related to the roughness of the road surface is irregular, and is independent of the period of rotation of the rotor as shown in FIG. 9. The steps 230 and 240 in FIG. 6 cooperate to provide the variance DVWB for every revolution of the rotor. As previously mentioned, the variance components caused by the rotor-teeth variation cyclically change at a period equal to the period of rotation of the rotor. Accordingly, the time-domain change in the variance components caused by the rotor-teeth variation remains substantially the same independent of turns of the rotor. The step 320 in FIG. 8 calculates the difference between the variance DVWB(n) corresponding to the current one revolution of the rotor and the variance DVWB(n-1) corresponding to the immediately preceding one revolution of the rotor. The calculation of the difference cancels the rotor-teeth-variation components of the variance DVWB(n) and the rotor-teeth-variation components of the variance DVWB(n-1) from each other since they are substantially the same. Therefore, the bad-road determination responsive to the difference between the variances DVWB(n) and DVWB(n-1) can be accurate.

In general, as the degree of the roughness of a road surface increases (as the degree of the badness of a road surface increases), the variance DVWB more varies from revolution to revolution of the rotor of the related vehicle wheel speed sensor. Thus, the difference between the variances DVWB(n) and DVWB(n-1) indicates the degree of the roughness of the road surface, that is, the degree of the badness of the road surface. Accordingly, the bad-road determination responsive the absolute value of the difference between the variances DVWB(n) and DVWB(n-1) provides accurate detection of the road-surface condition. As previously mentioned, the bad-road determination is executed by comparing the absolute value of the difference between the variances DVWB(n) and DVWB(n-1) with the predetermined reference value L corresponding to the prescribed bad-road criterional level.

Second Embodiment

A second embodiment of this invention is similar to the first embodiment thereof except for design changes mentioned later. The second embodiment of this invention extracts only road-roughness-related variation components from each of the output signals of the vehicle wheel speed sensors 5–8 (see FIG. 1) in a way different from the corresponding way used in the first embodiment of this invention.

The second embodiment of this invention implements the extraction of the road-roughness-related variation components on the basis of variations in change quantities of the vehicle wheel speeds or variations in variances of the vehicle wheel speeds.

In the case of variations in the change quantities of the vehicle wheel speeds, it is possible to use the absolute values of the vehicle wheel accelerations or the values which result from differentiating the differentiation-resultant values of the vehicle wheel accelerations.

Third Embodiment

A third embodiment of this invention is similar to the first embodiment thereof except for design changes mentioned later.

Figure 10:
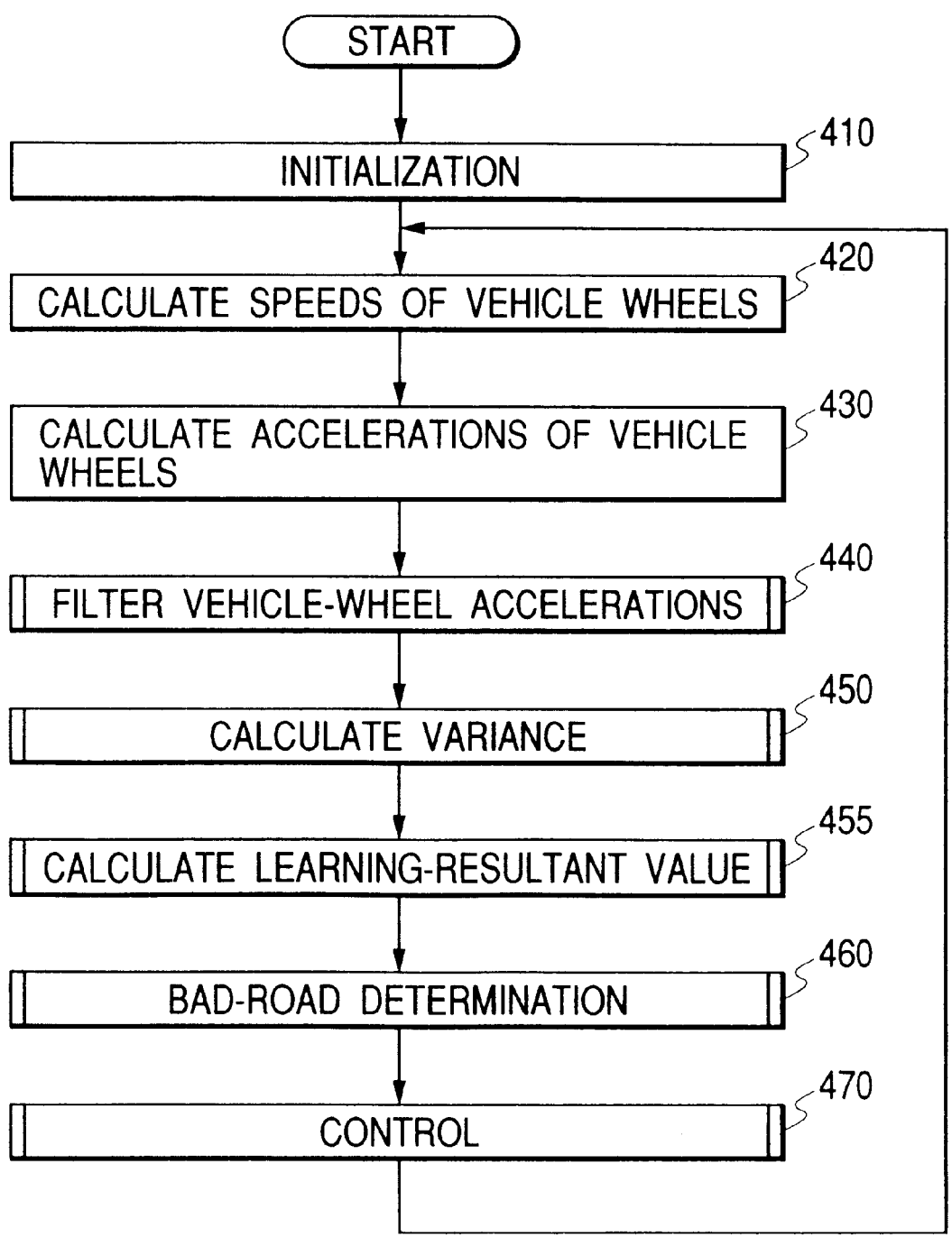
FIG. 10 is a flowchart of a segment of a program for an electronic control unit in a third embodiment of this invention.

FIG. 10 is a flowchart of a segment of a program for an electronic control unit 40 (see FIG. 1) in the third embodiment of this invention. The program segment in FIG. 10 relates to anti-skid control. The program segment is started when an ignition switch 41 (see FIG. 1) is changed to its ON position.

As shown in FIG. 10, a first step 410 of the program segment initializes variables including flags and counter values. After the step 410, the program advances to a step 420. As will be made clear later, a sequence of the step 420 and subsequent step and blocks is periodically iterated.

The step 420 computes the rotational speeds of vehicle wheels 1–4 (see FIG. 1) on the basis of the output signals from vehicle wheel speed sensors 5–8 (see FIG. 1) respectively.

A step 430 following the step 420 computes the accelerations of the vehicle wheels 1–4 from the vehicle wheel speeds given by the step 420.

A block 440 subsequent to the step 430 subjects the vehicle wheel accelerations (the before-filtering vehicle wheel accelerations) given by the step 430 to high-pass filtering processes to extract high-frequency components. Thus, the block 440 provides the filtering-resultant vehicle wheel accelerations (the after-filtering vehicle wheel accelerations). The function of the block 440 is similar to that of the block 140 in FIG. 3.

A block 450 following the block 440 computes variances of the filtering-resultant vehicle wheel accelerations given by the block 440.

A block 455 subsequent to the block 450 calculates learning-resultant values from the variances given by the block 450.

A block 460 following the block 455 determines whether or not the road surface along which a related vehicle is traveling is bad (rough) on the basis of the learning-resultant values given by the block 455.

A block 470 subsequent to the block 460 sets reference slip ratios for the vehicle wheels 1–4 in response to the result of the bad-road determination by the block 460. The block 470 calculates the current slip ratios of the vehicle wheels 1–4 in a known way. For each of the vehicle wheels 1–4, the block 470 compares the current slip ratio with the corresponding reference slip ratio. When the current slip ratio exceeds the reference slip ratio, the block 470 implements processing for ABS (antilock brake system) control in a known way. In addition, the block 470 sets an ABS control flag to a state of "1" which indicates that the ABS control is currently executed. On the other hand, when the current slip ratio is equal to or smaller than the reference slip ratio, the block 470 inhibits the execution of the ABS control and sets the ABS control flag to a state of "0" which indicates that the ABS control is at rest. In this way, the block 470 executes processing for the anti-skid control. After the block 470, the program returns to the step 420.

The variance calculation block 450 will be described below in more detail. For each of the vehicle wheels 1–4, the block 450 calculates a variance DVWB among a limited number "n" of samples of the filtering-resultant vehicle wheel acceleration (the after-filtering vehicle wheel acceleration) given by the block 440.

Figure 11:
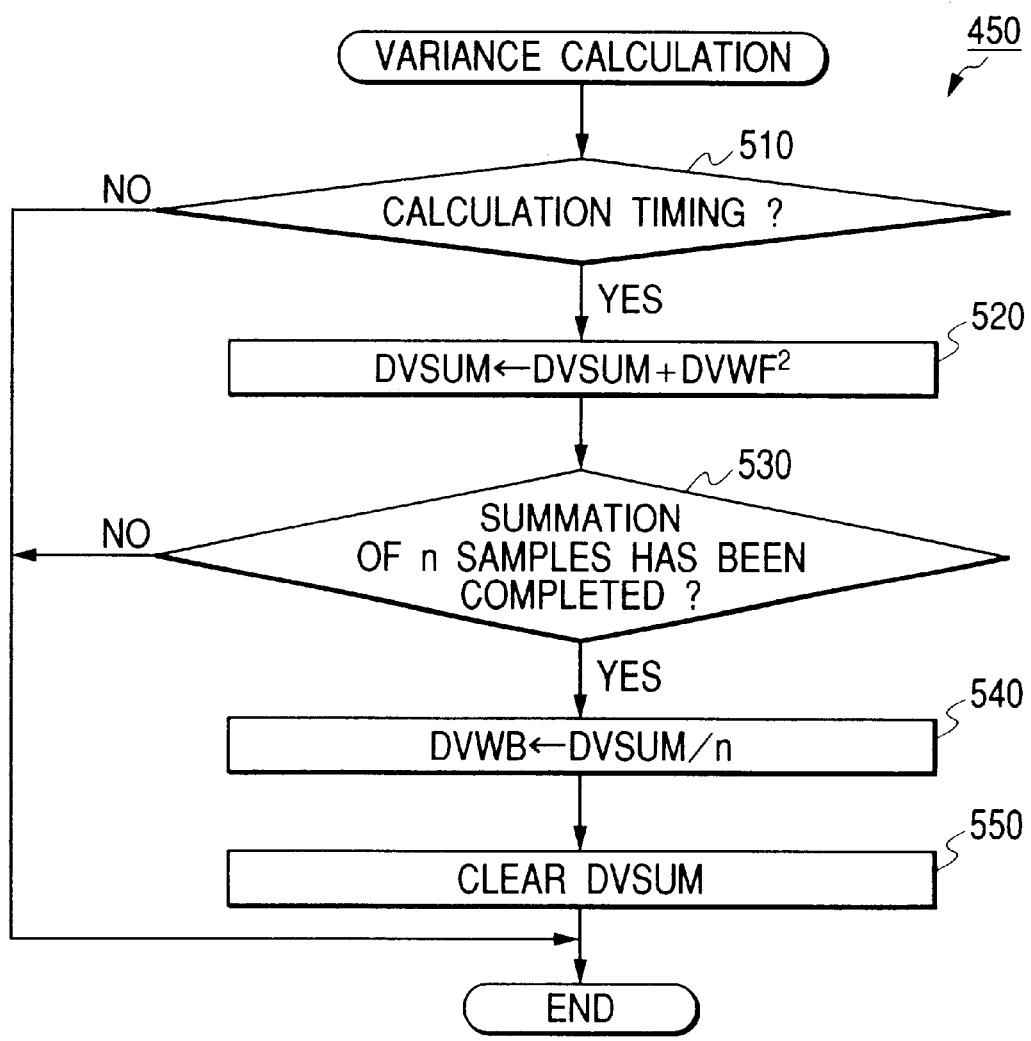
FIG. 11 is a flowchart of a variance calculation block in FIG. 10.

As shown in FIG. 11, the block 450 has steps 510, 520, 530, 540, and 550. The step 510 follows the block 440 (see FIG. 10). The step 510 determines whether or not a predetermined time period (for example, 5 ms) has elapsed since the last execution of the step 520. In the case where the predetermined time period has elapsed, the program advances from the step 510 to the step 520. Otherwise, the program advances from the step 510 to the block 455 (see FIG. 10).

The step 520 uses the current value of the after-filtering vehicle wheel acceleration DVWF given by the block 440 (see FIG. 10) as a current sample thereof. The step 520 calculates the square of the current sample (the current value) of the after-filtering vehicle wheel acceleration DVWF. The step 520 adds the calculated square to a partial-variance summation value DVSUM.

The step 530 follows the step 520. The step 530 determines whether or not the partial-variance summation value DVSUM has corresponded to the summation of the squares of "n" samples of the after-filtering vehicle wheel acceleration DVWF. Here, "n" denotes a predetermined natural number. In the case where the partial-variance summation value DVSUM has corresponded to the summation of the squares of "n" samples, the program advances from the step 530 to the step 540. Otherwise, the program advances from the step 530 to the block 455 (see FIG. 10).

The step 540 calculates the variance DVWB which is equal to the partial-variance summation value DVSUM divided by the sample number "n". The step 540 updates the variance. The step 540 stores information of the old variance into the RAM for later use.

The step 550 follows the step 540. The step 550 clears the partial-variance summation value DVSUM to "0". After the step 550, the program advances to the block 455 (see FIG. 10).

The learning-value calculation block 455 in FIG. 10 will be described below in more detail. The block 455 has sections for the vehicle wheels 1–4 respectively. The sections are similar. Therefore, only one of the sections will be explained.

In general, a variation in shape and position among the projections or the grooves in the teeth of the rotor of a vehicle wheel speed sensor causes a change in the output signal thereof. Therefore, a time-domain change in the output signal of the vehicle wheel speed sensor contains components caused by the rotor-teeth variation arid components related to road-surface conditions (roughness of a road surface). When a related vehicle is traveling on a good road surface, road-surface related components of a time-domain change in the output signal of the vehicle wheel speed sensor are substantially null. Thus, when the vehicle is traveling on a good road surface, rotor-teeth-variation related components are predominant in a time-domain change of the output signal of the vehicle wheel speed sensor. Accordingly, provided that the vehicle is traveling on a good road surface, the block 455 learns a time-domain change in the output signal of the vehicle wheel speed sensor and hence learns rotor-teeth-variation related components thereof.

Figure 12:
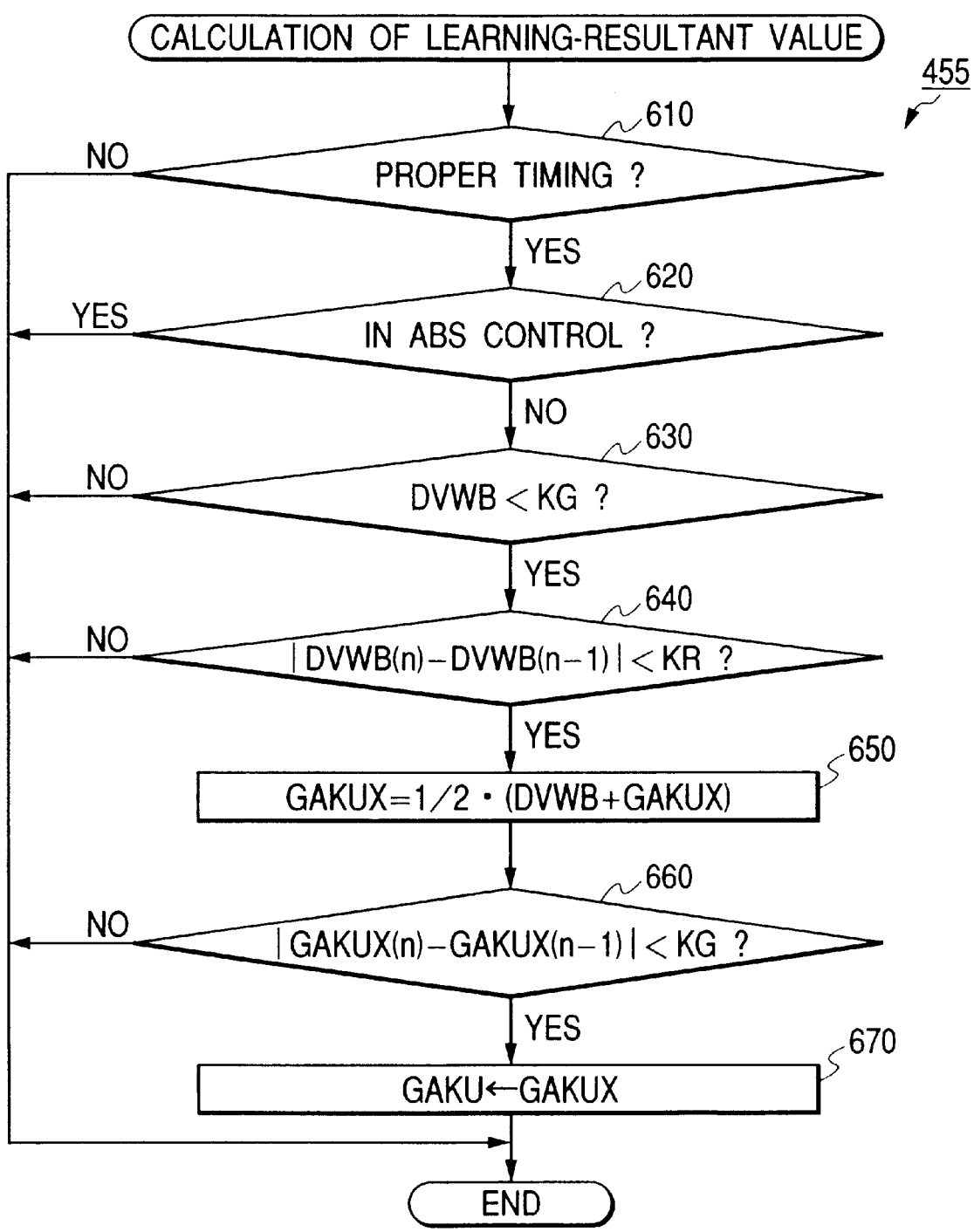
FIG. 12 is a flowchart of a learning-value calculation block in FIG. 10.

As shown in FIG. 12, the block 455 has steps 610, 620, 630, 640, 650, 660, and 670. The step 610 is subsequent to the block 450 (see FIG. 10). The step 610 determines whether or not the present moment immediately follows the moment of the execution of the step 540 (see FIG. 11), that is, the moment of the updating of the variance DVWB. In the case where the present moment immediately follows the moment of the updating of the variance DVWB, the program advances from the step 610 to the step 620. Otherwise, the program advances from the step 610 to the block 460 (see FIG. 10).

The step 620 determines whether or not the ABS control is currently executed by referring to the ABS control flag set by the block 470 (see FIG. 10). In the case where the ABS control is currently executed, the program advances from the step 620 to the block 460 (see FIG. 10). Otherwise, the program advances from the step 620 to the step 630. Noise components of the output signal from the vehicle wheel speed sensor tend to be relatively great during the execution of ABS control. The step 620 prevents learning from being implemented during the execution of the ABS control. The function of the step 620 is effective in enhancing the accuracy of the result of learning.

The step 630 determines whether or not the current variance DVWB(n) given by the block 450 (see FIG. 3) is smaller than a predetermined reference value KG corresponding to a criterion for bad roads. When the current variance DVWB(n) is smaller than the reference value KG, the program advances from the step 630 to the step 640. Otherwise, the program advances from the step 630 to the block 460 (see FIG. 10). The step 630 prevents learning from being implemented when the vehicle is traveling along a bad road.

The step 640 retrieves the immediately-preceding variance DVWB(n−1) given by the block 450 (see FIG. 3). The step 640 calculates the difference between the variances DVWB(n) and DVWB(n−1). The step 640 computes the absolute value of the calculated difference. The step 640 compares the computed absolute value with a predetermined reference value KR corresponding to a criterion for sufficiently good roads. When the absolute value is equal to or greater than the reference value KR, the program advances from the step 640 to the block 460 (see FIG. 10). Otherwise, the program advances from the step 640 to the step 650. The step 640 enables learning to be implemented only when the vehicle is traveling along a sufficiently good road.

The step 650 calculates the current smoothed variance or the current mean variance GAKUX(n) according to the following equation.

$$GAKUX(n)=(½)·\{DVWB(n)+GAKUX(n-1)\} \quad (3)$$

where GAKUX(n−1) denotes the immediately previous mean variance. The step 650 stores information of the mean variance GAKUX(n) into the RAM for later use.

The step 660 follows the step 650. The step 660 calculates the difference between the current mean variance GAKUX(n) and the immediately previous mean variance GAKUX(n−1). The step 660 computes the absolute value of the calculated difference. The step 660 compares the computed absolute value with a predetermined reference value corresponding to a criterion for sufficiently small differences. The reference value used by the step 660 may be equal to the previously-indicated reference value KG. When the absolute value is equal to or greater than the reference value (the reference value KG), the program advances from the step 660 to the block 460 (see FIG. 10). Otherwise, the program advances from the step 660 to the step 670. The step 660 prevents learning from being responsive to unreliable mean variances corresponding to non-convergence. It should be noted that as learning is iterated and advanced, the mean variance converges on an average among values available when the vehicle is traveling along sufficiently good roads.

The step 670 sets the current mean variance GAKUX(n) as a learning-resultant value GAKU. After the step 670, the program advances to the block 460 (see FIG. 10).

Figure 13:
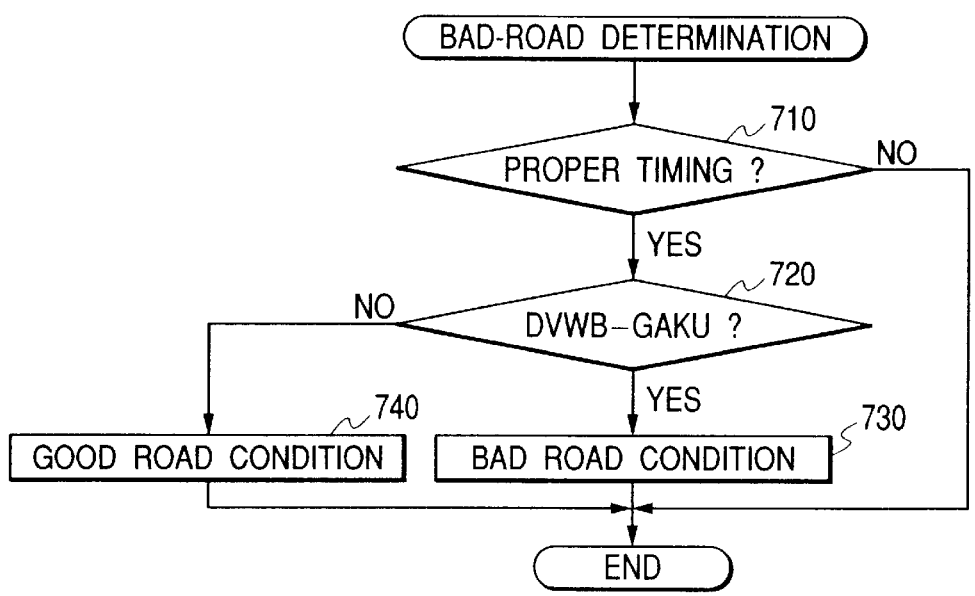
FIG. 13 is a flowchart of a bad-road determination block in FIG. 10.
Figure 14:
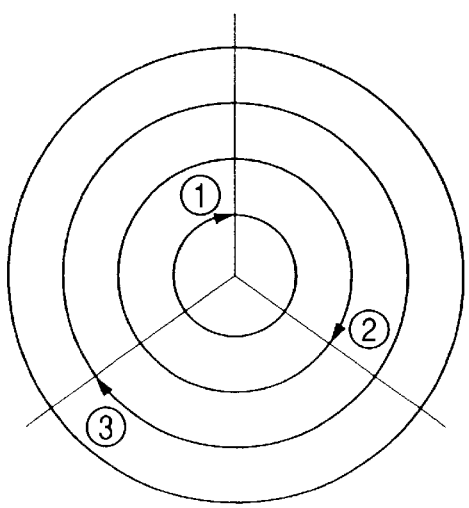
FIG. 14 is a diagram of time intervals for variance calculating summation which correspond to angular ranges with respect to a rotor of a vehicle wheel speed sensor in a fifth embodiment of this invention.

The bad-road determination block 460 in FIG. 10 will be described below in more detail. The block 460 has sections for the vehicle wheels 1–4 respectively. The sections are similar. Therefore, only one of the sections will be explained. As shown in FIG. 13, the block 460 has steps 710, 720, 730, and 740. The step 710 follows the block 455 (see FIG. 10). The step 710 determines whether or not a predetermined time period (for example, 50 ms) has elapsed since the last execution of the step 720. In the case where the predetermined time period has elapsed, the program advances from the step 710 to the step 720. Otherwise, the program advances from the step 710 to the block 470 (see FIG. 10).

The step 720 gets the current variance DVWB and the learning-resultant value GAKU given by the block 450 (see FIG. 10). The step 720 calculates the difference between the learning-resultant value GAKU and the current variance DVWB. The step 720 computes the absolute value of the calculated difference. The step 720 compares the computed absolute value with a predetermined reference value L corresponding to a prescribed bad-road criterional level. When the absolute value is equal to or greater than the reference value L, the program advances from the step 720 to the step 730. Otherwise, the program advances from the step 720 to the step 740.

The step 730 determines that the road surface along which the vehicle is traveling is bad (rough). Specifically, the step 730 sets a flag AK to a state of "1" which represents that the road surface is bad. After the step 730, the program advances to the block 470 (see FIG. 10).

The step 740 determines that the road surface along which the vehicle is traveling is good. Specifically, the step 740 sets the flag AK to a state of "0" which represents that the road surface is good. After the step 740, the program advances to the block 470 (see FIG. 10).

The learning-resultant value GAKU corresponds to an average among variances of the related vehicle wheel acceleration which are available when the vehicle is traveling along good roads. Accordingly, to extract time-domain change components from the output signal of the related vehicle wheel speed sensor which relate to road-surface conditions (roughness of the road surface), the step 720 in FIG. 13 calculates the difference between the learning-resultant value GAKU and the current variance DVWB. Generally, the road-surface-condition related change in the output signal of the vehicle wheel speed sensor increases as the degree of the roughness of the road surface rises. Thus, the step 720 compares the absolute value of the calculated difference with the reference value L corresponding to the bad-road criterional level. The comparison provides an accurate determination as to the road-surface condition.

Fourth Embodiment

A fourth embodiment of this invention is similar to the third embodiment thereof except for design changes mentioned later. The fourth embodiment of this invention extracts only road-roughness-related variation components from each of the output signals of the vehicle wheel speed sensors 5–8 (see FIG. 1) in a way different from the corresponding way used in the third embodiment of this invention.

The fourth embodiment of this invention implements the extraction of the road-roughness-related variation components on the basis of variations in change quantities of the vehicle wheel speeds or variations in variances of the vehicle wheel speeds.

In the case of variations in the change quantities of the vehicle wheel speeds, it is possible to use the absolute values of the vehicle wheel accelerations or the values which result from differentiating the differentiation-resultant values of the vehicle wheel accelerations.

Fifth Embodiment

A fifth embodiment of this invention is similar to the first embodiment thereof except for design changes mentioned later.

In the fifth embodiment of this invention, partial variances are summed for each of time intervals ①, ②, and ③ which corresponds to one revolution of a rotor in a vehicle wheel speed sensor. As shown in FIG. 13, the time intervals ①, ②, and ③ correspond to offset rotor angular ranges respectively. Specifically, the phases of the time intervals (the rotor angular ranges) ①, ②, and ③ differ from each other by 120°. The time interval ① corresponds to the rotor angular range between 0° and 360°. The time interval ② corresponds to the rotor angular range between 120° and 480°. The time interval ③ corresponds to the rotor angular range between 240° and 600°. According to the fifth embodiment of this invention, the period of the execution of the bad-road determination can be shorter.

Sixth Embodiment

A sixth embodiment of this invention is similar to one of the first to fifth embodiments of this invention except for design changes mentioned later.

The high-pass filtering of the vehicle wheel accelerations (see the block 140 in FIG. 3 or the block 440 in FIG. 10) is omitted from the sixth embodiment of this invention.

What is claimed is:

1. An apparatus for detecting a condition of a road surface, comprising:
vehicle wheel speed detecting means for outputting a vehicle wheel speed signal representing a speed of a wheel of a vehicle;
vehicle wheel speed summating means for summating variations in the vehicle wheel speed represented by the vehicle wheel speed signal during every time period corresponding to one revolution of the vehicle wheel, and for generating a summation value representing a result of said summating; and
road-surface condition detecting means for detecting a road-surface condition on the basis of a difference between a current summation value and a previous summation value generated by the vehicle wheel speed summating means.

2. An apparatus as recited in claim 1, further comprising:
vehicle wheel acceleration calculating means for calculating an acceleration of the vehicle wheel from the vehicle wheel speed signal outputted from the vehicle wheel speed detecting means; and
means provided in the vehicle wheel speed summating means for summating variations in the vehicle wheel acceleration calculated by the vehicle wheel acceleration calculating means, and for using a result of summating the variations in the vehicle wheel acceleration as a result of summating the variations in the vehicle wheel speed.

3. An apparatus as recited in claim 1, further comprising:
vehicle wheel acceleration calculating means for calculating an acceleration of the vehicle wheel from the vehicle wheel speed signal outputted from the vehicle wheel speed detecting means;
variance calculating means for calculating a variance of the vehicle wheel acceleration calculated by the vehicle wheel acceleration calculating means; and
means provided in the vehicle wheel speed summating means for using the variance calculated by the variance calculating means as a result of summating the variations in the vehicle wheel speed.

4. An apparatus as recited in claim 1, further comprising:
acceleration differential value calculating means for calculating a differential value of an acceleration of the vehicle wheel from the vehicle wheel speed signal outputted from the vehicle wheel speed detecting means; and
means provided in the vehicle wheel speed summating means for summating variations in the differential value calculated by the acceleration differential value calculating means, and for using a result of summating the variations in the differential value as a result of summating the variations in the vehicle wheel speed.

5. An apparatus as recited in claim 1, wherein the vehicle wheel speed detecting means comprises a vehicle wheel speed sensor.

6. An apparatus for detecting a condition of a road surface, comprising:
vehicle wheel speed detecting means for outputting a vehicle wheel speed signal representing a speed of a wheel of a vehicle;
learning means for learning a variation in the vehicle wheel speed represented by the vehicle wheel speed signal outputted from the vehicle wheel speed detecting means, and for generating a learning-resultant value representing a result of said learning; and
road-surface condition detecting means for detecting a road-surface condition on the basis of a difference between the learning-resultant value and a variation in the vehicle wheel speed represented by the vehicle wheel speed signal outputted from the vehicle wheel speed detecting means.

7. An apparatus as recited in claim 6, wherein the learning means comprises means for extracting components from the variation in the vehicle wheel speed which are caused by a variation in rotor manufacture accuracy, and means for learning the extracted components of the variation in the vehicle wheel speed which are caused by a variation in rotor manufacture accuracy.

8. An apparatus as recited in claim 6, wherein the learning means comprises means for learning an average of a value of summation of variations in the vehicle wheel speed.

9. An apparatus as recited in claim 6, further comprising:
vehicle wheel acceleration calculating means for calculating an acceleration of the vehicle wheel from the vehicle wheel speed signal outputted from the vehicle wheel speed detecting means;
means provided in the learning means for learning a variation in the vehicle wheel acceleration calculated by the vehicle wheel acceleration calculating means, and for using a result of learning the variation in the vehicle wheel acceleration as the learning-resultant value representing the result of learning the variation in the vehicle wheel speed; and
means provided in the road-surface condition detecting means for detecting the road-surface condition on the basis of a difference between the learning-resultant value and a variation in the vehicle wheel acceleration calculated by the vehicle wheel acceleration calculating means.

10. An apparatus as recited in claim 6, further comprising:
vehicle wheel acceleration calculating means for calculating an acceleration of the vehicle wheel from the vehicle wheel speed signal outputted from the vehicle wheel speed detecting means;

variance calculating means for calculating a variance of the vehicle wheel acceleration calculated by the vehicle wheel acceleration calculating means;

means provided in the learning means for learning a variation in the variance calculated by the variance calculating means, and for using a result of learning the variation in the variance as the learning-resultant value representing the result of learning the variation in the vehicle wheel speed; and means provided in the road-surface condition detecting means for detecting the road-surface condition on the basis of a difference between the learning-resultant value and a variation in the variance calculated by the variance calculating means.

11. An apparatus as recited in claim 6, further comprising:

acceleration differential value calculating means for calculating a differential value of an acceleration of the vehicle wheel from the vehicle wheel speed signal outputted from the vehicle wheel speed detecting means;

means provided in the learning means for learning a variation in the differential value calculated by the acceleration differential value calculating means, and for using a result of learning the variation in the differential value as the learning-resultant value representing the result of learning the variation in the vehicle wheel speed; and means provided in the road-surface condition detecting means for detecting the road-surface condition on the basis of a difference between the learning-resultant value and a variation in the differential value calculated by the acceleration differential value calculating means.

12. An on vehicle apparatus for detecting a condition of a road surface, comprising:

first means for detecting a rotational speed of a vehicle wheel;

second means for calculating an acceleration of the vehicle wheel from the vehicle-wheel speed detected by the first means;

third means for periodically sampling the vehicle-wheel acceleration calculated by the second means to generate samples of the vehicle-wheel acceleration;

fourth means for calculating a first variance among samples of the vehicle-wheel acceleration which are generated by the third means for a first time interval corresponding to current one revolution of the vehicle wheel, and calculating a second variance among samples of the vehicle-wheel acceleration which are generated by the third means for a second time interval corresponding to previous one revolution of the vehicle wheel;

fifth means for calculating a difference between the first and second variances calculated by the fourth means; and sixth means for detecting a road-surface condition in response to the difference calculated by the fifth means.

13. An on-vehicle apparatus as recited in claim 12, wherein the sixth means comprises 1) seventh means for determining whether or not the difference calculated by the fifth means is smaller than a predetermined reference value, 2) eighth means for determining that the road-surface condition is good when the seventh means determines that the difference is smaller than the predetermined reference value, and 3) ninth means for determining that the road-surface condition is bad when the seventh means determines that the difference is not smaller than the predetermined reference value.

14. An on-vehicle apparatus for detecting a condition of a road surface, comprising:

first means for detecting a rotational speed of a vehicle wheel;

second means for calculating an acceleration of the vehicle wheel from the vehicle-wheel speed detected by the first means;

third means for periodically sampling the vehicle-wheel acceleration calculated by the second means to generate samples of the vehicle-wheel acceleration;

fourth means for calculating a variance among samples of the vehicle-wheel acceleration which are generated by the third means for every time interval;

fifth means for periodically calculating a first difference between two successive variances calculated by the fourth means;

sixth means for periodically determining whether or not the first difference calculated by the fifth means is smaller than a predetermined reference value;

seventh means for, only when the sixth means determines that the first difference is smaller than the predetermined reference value, defining a variance calculated by the fourth means and relating to the first difference as an effective reference;

eighth means for generating a learning-resultant value in response to effective references generated by the seventh means;

ninth means for calculating a second difference between a current variance calculated by the fourth means and the learning-resultant value generated by the eighth means; and tenth means for detecting a road-surface condition in response to the second difference calculated by the ninth means.

15. An on-vehicle apparatus as recited in claim 14, wherein the tenth means comprises 1) eleventh means for determining whether or not the second difference calculated by the ninth means is smaller than a predetermined criterional value, 2) twelfth means for determining that the road-surface condition is good when the eleventh means determines that the second difference is smaller than the predetermined criterional value, and 3) thirteenth means for determining that the road-surface condition is bad when the eleventh means determines that the second difference is not smaller than the predetermined criterional value.

* * * * *